US010296580B1

(12) United States Patent
Pulla et al.

(10) Patent No.: US 10,296,580 B1
(45) Date of Patent: May 21, 2019

(54) DELIVERING PARSED CONTENT ITEMS

(71) Applicant: Amazon Technologies, Inc., Seattle, WA (US)

(72) Inventors: Venkata Sri Krishnakanth Pulla, Bellevue, WA (US); Andrew Kenneth Milton, Bellevue, WA (US); Kenneth Thomas Brown, Seattle, WA (US); Patrick Joseph Armstrong, Seattle, WA (US); Yasaswi Vempati, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 6 days.

(21) Appl. No.: 14/859,092

(22) Filed: Sep. 18, 2015

(51) Int. Cl.
G06F 3/00 (2006.01)
G06F 17/27 (2006.01)
G06F 17/22 (2006.01)

(52) U.S. Cl.
CPC .......... *G06F 17/272* (2013.01); *G06F 17/227* (2013.01); *G06F 17/2247* (2013.01)

(58) Field of Classification Search
CPC ... G06F 17/272; G06F 17/2247; G06F 17/227
See application file for complete search history.

(56) References Cited

U.S. PATENT DOCUMENTS

| 4,468,751 | A | 8/1984 | Plunkett, Jr. |
| 5,828,370 | A | 10/1998 | Moeller |
| 6,061,798 | A | 5/2000 | Coley et al. |
| 6,657,647 | B1 | 12/2003 | Bright |
| 7,191,467 | B1 | 3/2007 | Dujari et al. |
| 7,512,932 | B2 | 3/2009 | Davidov et al. |
| 7,627,814 | B1 * | 12/2009 | Soldan ................ G06F 17/2247 715/236 |
| 8,510,237 | B2 | 8/2013 | Cascaval |
| 8,555,157 | B1 | 10/2013 | Fu |
| 8,677,097 | B1 | 3/2014 | Nemazie et al. |
| 8,799,412 | B2 | 8/2014 | Trahan |
| 9,167,054 | B2 | 10/2015 | Trahan et al. |
| 9,292,367 | B2 | 3/2016 | Mickens |
| 9,383,932 | B2 | 7/2016 | Das Sharma |
| 9,509,783 | B1 | 11/2016 | Hayden |

(Continued)

OTHER PUBLICATIONS

Hickson, I., Ed., Web Storage, W3C Working Draft, Oct. 29, 2009, pp. 11-18, http://www.w3.org/TR/2009/WD-webstorage-20091029/.

(Continued)

*Primary Examiner* — Kyle R Stork
(74) *Attorney, Agent, or Firm* — Knobbe, Martens, Olson & Bear, LLP

(57) ABSTRACT

Systems and methods are described that relate to processing content, such as web pages, to be rendered and displayed on client computing devices. In one embodiment, a content parsing system may retrieve a content item on behalf of a client computing device, and parse markup language within the content item to generate a binary representation of objects within the content item. The content parsing system may then serialize the binary representation, and transmit the binary representation to the client computing device. The client computing device can then utilize the binary representation to output the content item, without parsing at least a portion of the content item.

21 Claims, 8 Drawing Sheets

(56) References Cited

U.S. PATENT DOCUMENTS

| | | |
|---|---|---|
| 9,749,202 B1 | 8/2017 | Jain et al. |
| 9,811,321 B1 | 11/2017 | Karppanen |
| 9,881,096 B1 | 1/2018 | Warr et al. |
| 9,888,074 B1 | 2/2018 | Roy et al. |
| 2001/0042045 A1 | 11/2001 | Howard et al. |
| 2001/0043800 A1 | 11/2001 | Gotoh et al. |
| 2002/0009078 A1 | 1/2002 | Wilson et al. |
| 2002/0013833 A1 | 1/2002 | Wyatt et al. |
| 2002/0133627 A1 | 9/2002 | Maes |
| 2002/0147788 A1 | 10/2002 | Nguyen |
| 2003/0014478 A1 | 1/2003 | Noble |
| 2003/0055610 A1 | 3/2003 | Webber |
| 2004/0015476 A1 | 1/2004 | Twaddle |
| 2004/0230903 A1 | 11/2004 | Elza et al. |
| 2005/0108627 A1 | 5/2005 | Mireku |
| 2005/0149718 A1 | 7/2005 | Berlin et al. |
| 2005/0198365 A1 | 9/2005 | Wei |
| 2006/0136552 A1 | 6/2006 | Krane et al. |
| 2006/0168101 A1 | 7/2006 | Mikhailov et al. |
| 2007/0005622 A1 | 1/2007 | Fernandes et al. |
| 2007/0192329 A1 | 8/2007 | Croft et al. |
| 2008/0139191 A1 | 6/2008 | Melnyk |
| 2008/0313206 A1 | 12/2008 | Kordun et al. |
| 2009/0138937 A1 | 5/2009 | Erlingsson et al. |
| 2009/0168760 A1 | 7/2009 | Katis et al. |
| 2009/0202159 A1 | 8/2009 | Ström |
| 2009/0210631 A1 | 8/2009 | Bosworth et al. |
| 2009/0319776 A1 | 12/2009 | Burch et al. |
| 2010/0005053 A1 | 1/2010 | Estes |
| 2010/0077444 A1 | 3/2010 | Forristal |
| 2010/0312858 A1 | 12/2010 | Mickens et al. |
| 2010/0313065 A1 | 12/2010 | Feeley et al. |
| 2010/0313189 A1 | 12/2010 | Beretta et al. |
| 2011/0015917 A1 | 1/2011 | Wang et al. |
| 2011/0082996 A1 | 4/2011 | Wester et al. |
| 2011/0145360 A1 | 6/2011 | Sheshagiri et al. |
| 2011/0176790 A1 | 7/2011 | Morris |
| 2011/0191677 A1 | 8/2011 | Morris |
| 2011/0252312 A1 | 10/2011 | Lemonik |
| 2011/0258532 A1 | 10/2011 | Ceze et al. |
| 2012/0066380 A1 | 3/2012 | Gao et al. |
| 2012/0066586 A1 | 3/2012 | Shemesh |
| 2012/0173966 A1 | 7/2012 | Powell et al. |
| 2012/0239598 A1 | 9/2012 | Cascaval et al. |
| 2012/0260157 A1 | 10/2012 | Zhu et al. |
| 2012/0330984 A1 | 12/2012 | Fablet et al. |
| 2012/0331228 A1 | 12/2012 | Shatz |
| 2013/0007100 A1 | 1/2013 | Trahan |
| 2013/0031459 A1 | 1/2013 | Khorashadi et al. |
| 2013/0058414 A1 | 3/2013 | Tsuru |
| 2013/0061293 A1 | 3/2013 | Mao |
| 2013/0067086 A1 | 3/2013 | Hershko et al. |
| 2013/0246906 A1* | 9/2013 | Hamon ............... G06F 17/2252 715/234 |
| 2014/0033019 A1 | 1/2014 | Zhang |
| 2014/0040139 A1 | 2/2014 | Brudnick et al. |
| 2014/0052702 A1 | 2/2014 | Fierro et al. |
| 2014/0053064 A1 | 2/2014 | Weber et al. |
| 2014/0109078 A1 | 4/2014 | Lang et al. |
| 2014/0126309 A1 | 5/2014 | Kelly et al. |
| 2014/0143651 A1 | 5/2014 | Klotzer et al. |
| 2014/0164960 A1 | 6/2014 | Kuo |
| 2014/0201809 A1 | 7/2014 | Choyi et al. |
| 2014/0281918 A1 | 9/2014 | Wei et al. |
| 2015/0026566 A1 | 1/2015 | Hui |
| 2015/0052596 A1 | 2/2015 | Ayanam |
| 2015/0089352 A1* | 3/2015 | Conboy ............... G06F 12/0862 715/234 |
| 2015/0135061 A1 | 5/2015 | Palanichamy et al. |
| 2015/0161087 A1 | 6/2015 | Khoo |
| 2015/0205761 A1 | 7/2015 | Shah |
| 2015/0269065 A1 | 9/2015 | Bourd et al. |
| 2015/0271188 A1 | 9/2015 | Call |
| 2015/0279463 A1 | 10/2015 | Berke |
| 2016/0057220 A1 | 2/2016 | Gibbs et al. |
| 2016/0142914 A1 | 5/2016 | He et al. |
| 2016/0188279 A1 | 6/2016 | Rajamani et al. |
| 2016/0205088 A1 | 7/2016 | Sreesha et al. |
| 2017/0302976 A1 | 10/2017 | Puttagunta et al. |
| 2017/0329554 A1 | 11/2017 | Voigt et al. |

OTHER PUBLICATIONS

Jquery API Documentation, Feb. 10, 2010, Version 1.2, p. 162, http://api.jquery.com/serialize/.

Allen, M., HydrateJS by nanodeath, Dec. 14, 2013, http://nanodeath.gihub.io/HydrateJS/.

Gross, R., and A. Wightman, MarioNet Split Web Browser, p. 1, Jan. 1999, https://en.wikipedia.org/wiki/MarioNet_split_web_browser.

Wellons, C., Precise JavaScript Serialization With ResurrectJS, Mar. 28, 2013, http://nullprogram.com/blog/2013/03/28/.

Garsiel, T., and P. Irish, How Browsers Work: Behind the Scenes of Modern Web Browsers, http:www.html5rocks.com/en/tutorials/internals/howbrowserswork/, published Aug. 5, 2011, pp. 1-62, retrieved Jun. 25, 2015.

\* cited by examiner

DELIVERING PARSED CONTENT ITEMS

BACKGROUND

Generally described, computing devices and communication networks can be utilized to exchange information. In a common application, a computing device can request content items, such as web pages, from another computing device via the communication network. For example, a user at a client computing device can utilize a software browser application, typically referred to as a "web browser," to request a web page from a server computing device via the Internet.

Many network-transmitted content items, such as web pages, are formatted according to a human-readable markup language format (e.g., the hypertext markup language, or "HTML"). These documents define a collection of objects, such as text, images, videos, applications, or other data, that is organized into a hierarchical structure. In order to display such content items, a browser executing on a client computing device must generally parse the content item to identify these objects and build a binary representation of the hierarchical structure, which is sometimes referred to as a parse tree. Where content items are described according to the Document Object Model (DOM) (a common convention for representing markup language documents), this parse tree is often referred to as a "DOM tree." The browser can then combine the parse tree with other information, such as styling and layout information, to build a representation of the content item for display to a user.

In many content items, and especially in large or complex content items, generation of the parse tree represents a significant portion of the total time required by a computing device to display the content item. From the perspective of a user utilizing a client computing device, a user experience can be defined in terms of the performance and latencies associated with displaying a content item. Thus, inefficiencies and delays in generating a parse tree for a content item serve to diminish the user experience. Such inefficiencies and delays may be especially apparent on computing devices with limited computing resources, such as processing power, memory, network connectivity, or battery power, and may actually increase the amount of computing resources (e.g., battery power) used by the computing device to display a content item.

DETAILED DESCRIPTION

Figure 1:
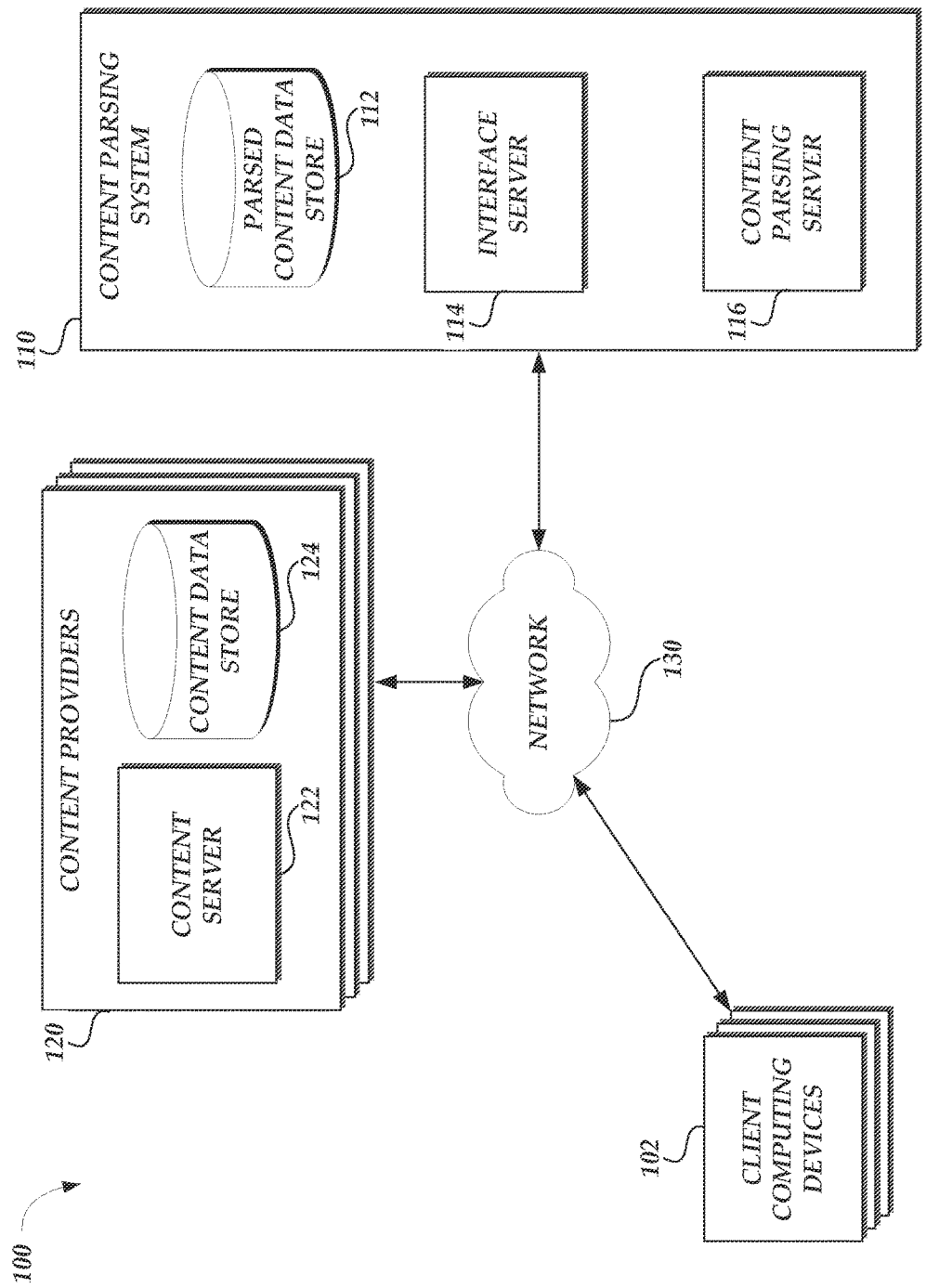
FIG. 1 is a block diagram depicting an illustrative operating environment including multiple client computing devices and content providers, as well as a content parsing system enabling content items of the content providers to be transmitted to the client computing device in a parsed version, thus increasing the speed and efficiency of the client computing devices in displaying the content items.

Generally described, aspects of the present disclosure relate to processing textual, non-binary content, such as web pages, to be rendered and displayed on client computing devices. Specifically, aspects of the present disclosure enable the use of a content parsing system to parse content items and generate binary representations of the content items or objects defined within those content items. These binary representations may thereafter be serialized and transmitted to a client computing device, such that the client computing devices are not required to parse at least a portion the content item prior to output. Content items that have been at least partially parsed are generally referred to herein as "parsed versions" of the content item. In instances where a content item is a web page described according to the DOM, a parsed version of the content item may include a binary representation of a DOM tree for the web page, or may include binary representations of each node to be included within the DOM tree. These binary representations can then be reconstructed at a client computing device to enable the content item to be rendered without parsing on the client computing device itself.

In an illustrative example, a client computing device transmits a request to the content parsing system for a web page available at a specified universal resource locator ("URL"). The content parsing system then retrieves an HTML document corresponding to the web page, and parses the HTML document to build a DOM tree corresponding to the web page. The content parsing system then serializes the DOM tree into a set of binary information, and transmits that serialized binary information to the client computing device. The client computing device can then utilize the serialized binary information to reconstruct a DOM tree for the web page, which can be combined with other information (e.g., style information corresponding to the web page, local configuration information of the client computing device, etc.) to render and display the web page. Because the client computing device is not required parse the HTML document to build the DOM tree corresponding to the web page, the computing resources required by the client computing device are reduced. Moreover, in instances where the content parsing system has access to more computing resources that the client computing, the content parsing system may be capable of parsing the HTML more quickly than the client computing device. Such instances may be especially common where the client computing device is a mobile device, such as a mobile phone, laptop, or tablet computer. Thus, the total time required to view the web page on the client computing device is reduced.

In some embodiments, the content parsing system may be configured to provide parsed version of content items to multiple client computing devices, many of which may request the same content items. Accordingly, the content parsing system can include a parsed content data store utilized to cache parsed versions of content items. When a content item is initially requested by a client computing device, a parsed version of the content item can be generated and, in addition to being delivered to the initially requesting device, be stored within the parsed content data store. Thereafter, subsequent requests for the content item can be serviced based on the previously parsed versions within the data stores, without requiring the content parsing system to retrieve the content item from its initial location or generate a new parsed version of the content item. Because retrieval of a previously parsed version of a content item can occur more rapidly than generating a new parsed version of the content item, the use of previously parsed versions of content items to service client requests can further increase the speed and efficiency at which content items are output to users.

In some instances, the content parsing system may transmit a parsed version of a content item to a client computing device via a binary serialization format. For example, the content parsing system may generate a binary representations for one or more nodes of a parse tree defined within the content item, and transmit those binary representations to a client computing device. The client computing device can then quickly recreate the parse tree of the content item, without itself being required to parse the content item. In some embodiments, the content parsing system may monitor its own parsing of the content item in order to make recreation of a parse tree on the client computing device more efficient.

In one embodiment, the content parsing system may enable a client computing device to pre-fetch content that may potentially block reconstruction of the parse tree on the client computing device. Specifically, the content parsing system may identify, during parsing of a content item, one or more external content items (such as external client-side scripting files or cascading style sheet (CSS) documents) that must be retrieved and processed in order to complete parsing of the content item. Such external content items are sometimes referred to as "blocking" content, since parsing of a content item is blocked until that external content is retrieved and processed. Often, it is impractical or impossible to process blocking content solely at the content parsing system, since a result of processing the blocking content may depend at least in part on a configuration of the client computing device. Thus, transmitting a direct parsing of the content item to the client computing device may result in the client computing device being "blocked" during reconstruction of a parse tree, such that the client must retrieve and process the blocking external content before reconstruction can be completed. To address this inefficiency, the content parsing system may transmit an indication of any identified blocking content to the client computing device, thus enabling the client computing device to pre-fetch the identified blocking content, such delays required to retrieve the content during reconstruction of a parse tree are reduced or eliminated.

Some examples are provided herein with respect to specific types of content items, such as web pages. As used herein, the term "web page" is intended to refer to a content item defined at least in part by an HTML document (e.g., a document including HTML, regardless of the file type or other content of the file) and displayable by a client computing device (e.g., via a "web browser" application). For the purposes of illustration, a web page may be referred to herein with respect to that HTML document itself. One of skill in the art will appreciate that a web page or similar content items may include additional, related content items, such as images, video, text, executable code (e.g., client-side scripting), style information or applications that are referenced, but not included, in the HTML document. While distinct from the HTML document, these additional content items may in some embodiments be considered to form part of a web page itself. While examples are provided herein with respect to web pages and corresponding HTML documents, embodiments of the present application may be implemented with respect to any textual, non-binary content item which must be parsed prior to output by a client computing device. Examples of such textual, non-binary content items include hierarchically structured markup language documents, such as HTML documents, XHTML documents, XML documents, and cascading style sheet (CSS) documents. While various interactions are described herein with reference to rendering and display of content items, embodiments of the present disclosure may further enable a client computing device to utilize parsed versions of non-displayed content items, such as client side scripting files. For example, a content parsing system may parse a JAVASCRIPT™ file to generate a binary representation of that file, which may thereafter be serialized and transmitted via a binary serialization protocol to a client computing device. The client computing device may then utilize the binary representation of the JAVASCRIPT file (e.g., in a web page referencing the JAVASCRIPT file) without being required to parse the text of the JAVASCRIPT file, Thus, the examples provided herein are intended to be illustrative and not exhaustive in nature. Moreover, references to specific types of parsed versions of a content item (e.g., a "parse tree" representing a hierarchy of objects within a content item) should be understood to be illustrative, and embodiments related to alternative types of parsed versions, such as a binary representation of client-side scripting information, are specifically contemplated within the scope of the present disclosure.

As will be appreciated by one of skill in the art in light of the present description, the embodiments disclosed herein substantially increase the ability of computing systems, such as client computing devices, to quickly and efficiently process content items, while reducing the computing resources (e.g., processing time, memory, and power) required on a client computing device to process such content items. Thus, the presently disclosed embodiments represent an improvement in the functioning of client computing devices themselves. Moreover, the presently disclosed embodiments address technical problems inherent within computing devices; specifically, the limited computing resources available to individual client computing devices, and the inefficiencies created by parsing textual, non-binary content items. These technical problems are addressed by the various technical solutions described herein, including the generation of parsed versions of content items by a content parsing system and the delivery of those parsed versions to client computing devices. Thus, the present application represents a substantial improvement on existing network-based content delivery systems and computing devices in general.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network 100 including multiple client computing devices 102 and multiple content providers 120 in communication with a content parsing system 110 via a network 130. While the client computing devices 102 and the content providers 120 are shown as a group within FIG. 1, the client computing devices 102 and content providers 120 may be geographically distant, and independently owned or operated. For example, the client computing devices 102 could represent a multitude of users in various global, continental, or regional locations accessing the content parsing system 110. Further, the content providers 120 could represent a multitude of related or distinct parties that provide content, such as web sites, or other network-deliverable content to the client computing devices 102. Accordingly, the groupings of client computing devices 102 and content providers 120 within FIG. 1 is intended to represent a logical, rather than physical, grouping. Similarly, while one set of illustrative components is shown to represent the content parsing system 110, multiple instances of each component may be present within the content parsing system 110, and such components may be located within geographically diverse areas (e.g., globally, continentally, or regionally), in order to provide a wide geographical presence for the content parsing system 110.

Network 130 may be any wired network, wireless network, or combination thereof. In addition, the network 130 may be a personal area network, local area network, wide area network, cable network, satellite network, cellular telephone network, or combination thereof. In the example environment of FIG. 1, network 130 is a global area network (GAN), such as the Internet. Protocols and components for communicating via the other aforementioned types of communication networks are well known to those skilled in the art of computer communications and thus, need not be described in more detail herein. While each of the client computing devices 102, content providers 120, and content parsing system 110 is depicted as having a single connection to the network 130, individual components of the client computing devices 102, content providers 120, and content parsing system 110 may be connected to the network 130 at disparate points. Accordingly, communication times and capabilities may vary between the components of FIG. 1. In one embodiment, the content parsing system 110 may connect to the network 130 via one or more preferred communication channels, such that the communication times and capabilities of the content parsing system are expected to generally exceed those of client computing devices 102. For example, where the network 130 is the Internet, the content parsing system 110 may represent a "tier 1 network" with access to high-capacity data routes (e.g., "backbone routes") on the Internet. Such preferred communication channels can enable the content parsing system 110 to retrieve content items from content providers 120 and deliver the content items to client computing devices 102 with little or no perceivable delay versus direct transmission of the content items from content providers 120 to the client computing devices 102.

Client computing devices 102 may include any number of different computing devices capable of communicating with the content parsing system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 102 may include one or more data stores (not shown in FIG. 1) including various applications or computer-executable instructions, such as web browsers, used to implement the embodiments disclosed herein. On an individual basis, client computing devices 102 may generally have access to fewer computing resources (e.g., processing power, memory, persistent storage space, electronic power, network communication capabilities, etc.) than the content parsing system 110.

Content providers 120 may include any computing systems configured to delivery content items, such as web pages, to client computing devices 102 over the network 130. In embodiments where the network 130 is the Internet, content providers 102 may make content items available via one or more URLs, from which client computing devices 102 may retrieve the content items. Accordingly, each content provider 120 may include a content data store 124 in which to store the content items (e.g., HTML, XML, XHTML, or CSS documents, as well as associated text, images, videos, applications, executable code or other data referenced in such documents). Each content provider 120 may further include a content service 122 (e.g., a "web server") configured to receive requests for content items, and to return such content items to a requesting device. The operation of content servers is known within the art, and therefore will not be described in detail herein. Content providers 120 are illustratively shown in FIG. 1 as distinct from the content parsing system 110. However, in some embodiments, the content parsing system 110 may associated with one or more content providers 120, and thus the one or more content providers 120 and the content parsing system 110 may be integrated into a single system.

In accordance with embodiments of the present disclosure, the content parsing system 110 includes an interface server 114, a content parsing server 116, and a parsed content data store 112. As described in further detail below, the interface server 114 can receive request from client computing devices 102 for content items provided by a content provider 120, and return a parsed version of the content item to the client computing device 102 for output to a user. As such, the interface server 114 may operate similarly to a proxy server, such that requests from the client computing device 102 for content items provide by the content providers 120 are initially routed to the interface server 114, rather than to the content providers 120. To facilitate generation of passed versions of content items, the content parsing system 110 includes a content parsing server 116. As described in further detail below, the content parsing server 116 is configured to receive a content item from a content provider 120 and to parse the content item to generate a binary representation of the objects referenced within the content item (e.g., a parse tree or individual nodes to be included within a parse tree), which can then be delivered by the interface server 114 to a requesting client computing device 102 as a parsed version of the content item. The content parsing server 115 may further store the parsed version of the content item within a parsed content data store 112, such that subsequent requests from client computing devices 102 for the content item can be serviced using the previously generated parsed version. The parsed content data store 112 may include any persistent or substantially persistent data storage device, or combination of such devices, including but not limited to magnetic storage devices (e.g., a hard disk), optical storage medium devices (e.g., compact discs [CD] drives or a digital versatile disc [DVD] drives), high-definition optical storage mediums, electronic storage devices (e.g., an erasable programmable read-only memory [EPROM]), solid-state memories, flash storage devices, or other data storage devices known in the art. In some embodiments, the content parsing system may include one or more additional data stores (not shown in FIG. 1) to store programming instructions for implementing various aspects of the embodiments of the present disclosure.

It will be appreciated by those skilled in the art that the content parsing system 110 may have fewer or greater components than are illustrated in FIG. 1. In addition, the content parsing system 110 could include various web services and/or peer-to-peer network configurations. Thus, the depiction of the content parsing system 110 in FIG. 1 should be taken as illustrative. For example, in some embodiments, components of the content parsing system 110, such as the content parsing server 116, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Any one or more of the interface server 114, the content parsing server 116 or the parsed content data store 112 may be embodied in a plurality of components, each executing an instance of the respective interface server 114, content parsing server 116 or parsed content data store 112. A server or other computing component implementing any one of the interface server 114, the content parsing server 116 or the parsed content data store 112 may include a network interface, memory, processing unit, and computer readable medium drive, all of which may communicate which each other may way of a communication bus. The network interfaces of such a server may provide connectivity over the network 130 and/or other networks or computer systems. The processing unit of such a server may communicate to and from memory containing program instructions that the processing unit executes in order to operate the respective the interface server 114, the content parsing server 116 or the parsed content data store 112. The memory of such a server may generally include RAM, ROM, other persistent and auxiliary memory, and/or any non-transitory computer-readable media.

Figure 2A:
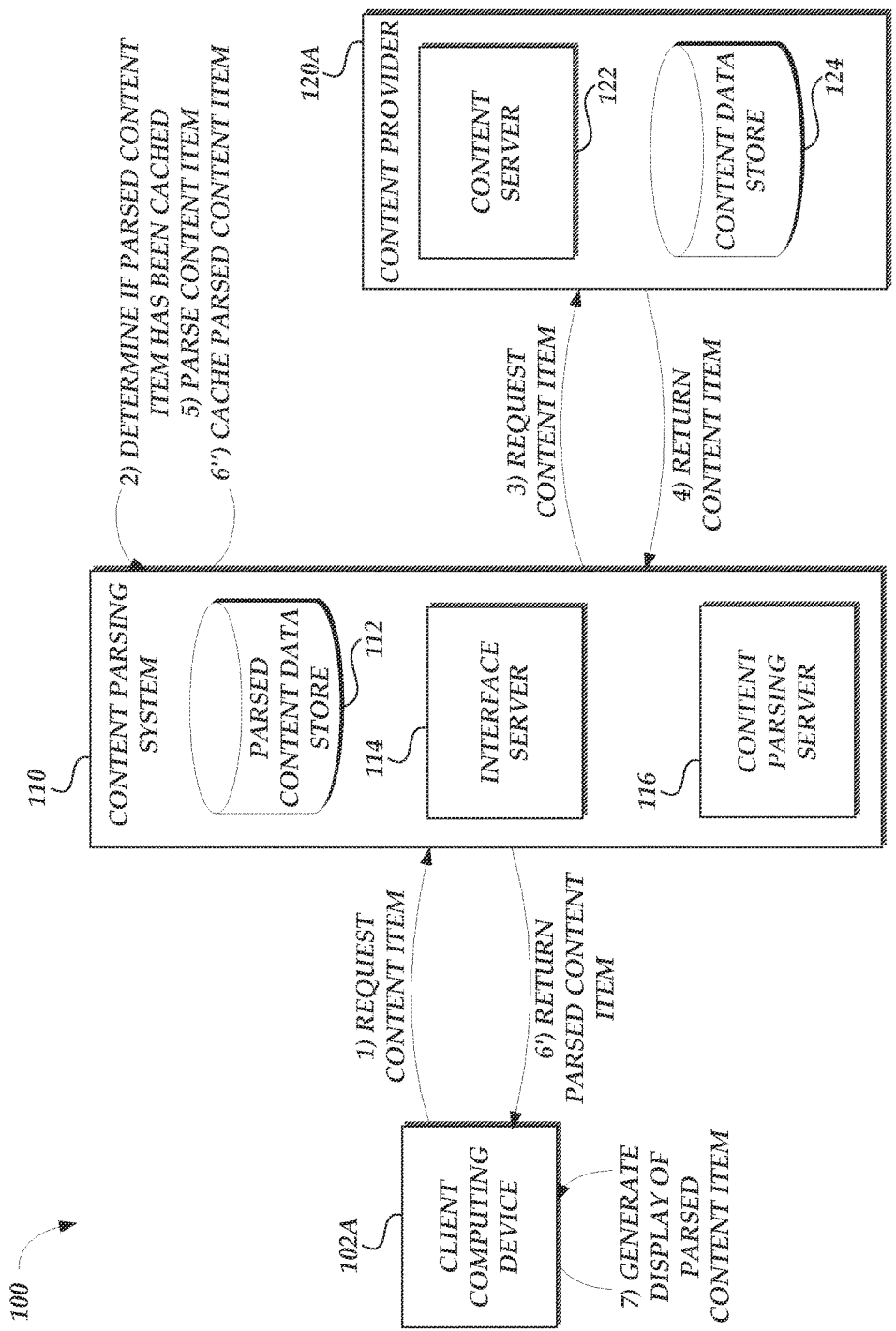
FIG. 2A is a block diagram depicting interactions within the operating environment of FIG. 1 to transmit a parsed version of a content item to a client computing device, including the retrieval of the content item from a content provider and the parsing of the content item by the content parsing system.
Figure 2B:
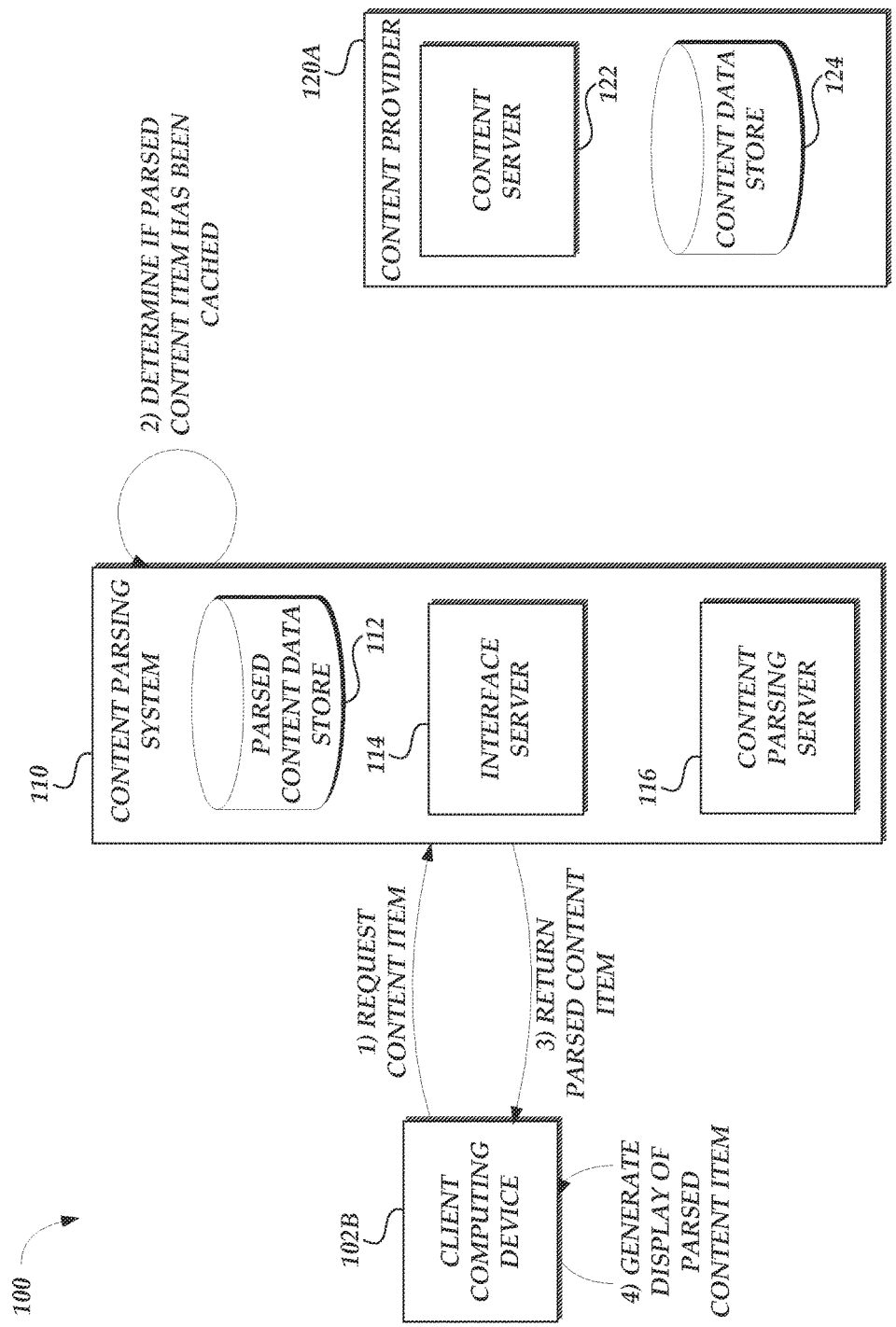
FIG. 2B is a block diagram depicting interactions within the operating environment of FIG. 1 to transmit a parsed version of a content item to a client computing device, including the retrieval of a previously parsed version of the content item from a cache of the content parsing system.

FIGS. 2A and B depict illustrative interactions for providing a parsed version of a content item provided by a content provider 120A to client computing devices 102. Specifically, FIG. 2A represents interactions for retrieving the content item from the content provider 120A, and generating a parsed version of the content item for delivery to a first client computing device 102A. FIG. 2B represents interactions for servicing a request from a second client computing device 102B for the same content item, based on the previously generated parsed version of the content item.

With reference to FIG. 2A, the interactions depicted therein begin at (1), where a client computing device 102 transmits a request for a content item to the content parsing system 110. Illustratively, interaction (1) may represent a hypertext transfer protocol (HTTP) request generated in response to a user of the client computing device 102A entering a URL of a web page into a browser application executing on the client computing device 102A, or selecting a link to a web page from within the browser application. In some embodiments, the browser application (or other software executing on the client computing device 102A, such as an operating system) may be preconfigured to utilize the content parsing system 110 to service requests for content items such as web pages, and thus, the user may not be required to explicitly designate that the request for the content item is passed to the content parsing system 110. In other embodiments, a user of the client computing device 102A may manually specify that the request for the content item be passed to the content parsing system 110 (e.g., by enabling computer-executable code provided by the content parsing system 110, such as a "plug-in," within a browser, by prepending a URL of the desired content item with a URL of the content parsing system 110, etc.).

On receiving the request for the content item, the content parsing system 110, at (2), determines whether a parsed version of the content item has been previously generated by the content parsing system 110 and cached within the parsed content data store 112. If such a parsed version of the content item exists within the parsed content data store 112 and is otherwise valid (e.g., not out of date or expired), the content parsing system 110 may be able to service the request by use of that previously generated parsed version of the content item. However, for the purposes of FIG. 2A, it is assumed that no valid parsed version of the content item is stored within the parsed content data store 112. As such, the interactions continue at (3), where the content parsing system 110 transmits a request for the content item to the content provider 120A. Where the content item is a web page, the request transmitted by the content parsing system 110 may be an HTTP request directed to a URL associated with the content server 122 (e.g., a "web server") of the content provider 120A. In response to this request, the content provider 120A returns the content item (e.g., as an HTML document) to the content parsing system 110.

At (5), the content parsing system 110 parses the content item to generate a parsed version of the content item, which includes a binary representation of one or more objects within the content item. Specifically, the content parsing system 110 may utilize the content parsing server 116 to parse markup language of the content item to identify a hierarchical structure of objects within the content item, and to generate a binary representation of such objects that may be transmitted to the client computing device 102A for display. In some embodiments, the content parsing system 110 further assembles such objects into a parse tree transmittable to the client computing device 102A. For example, where the content item corresponds to an HTML document expressed according to the DOM convention, the content parsing server 116 may parse the HTML document to generate a set of binary DOM nodes that may be transmitted to the client computing device 102A, and may further link the binary DOM nodes into a DOM tree transmittable to the client computing device 102A. The process of parsing an HTML document to generate binary DOM nodes and a corresponding a DOM tree is generally referred to as "building the DOM tree."

In some embodiments, the content parsing server 116 may utilize existing software components to aid in parsing content items to generating binary representations of the objects referenced therein. Such software components are commonly used in browser applications, and are sometimes referred to as "web browser engines" or "layout engines."

Examples of such software components include, but are not limited to, the WebKit layout engine software, the Blink web browser engine, and the Gecko web browser engine, each of which is known in the art. In some embodiments, the content parsing server 116 can implement a browser application itself in order to parse content items. In such embodiments, the browser application may be modified (e.g., by direct modification of the browser application's code or by addition of software, such as a "plug-in") to enable export of binary representations of the objects within content items to client computing device 102A or to the parsed content data store 112. Such browser applications may further be modified in order to inhibit or remove other functionality typically present within the browser application, such as further processing of a content item after generating of the binary representations of the objects within the content item.

After parsing the content item, at (6'), the content parsing system 110 returns a parsed version of the content item to the client computing device 102A. In one embodiment, the parsed version of the content item includes a binary representation of objects defined within the content item, such as DOM nodes defined by an HTML document. In another embodiment, the parsed version of the content item may further designate relationships between such objects, thus forming a parse tree, such as a DOM tree. The parsed version of the content item may further specify additional information needed by the client computing device 102 to display the content item, such as style information, client-side scripting code (e.g., JAVASCRIPT™), or references to additional content items (e.g., images, video, external style information or client-side scripting code, etc.). Transmission of the parsed version of the content item may be facilitated by any binary serialization protocol. In one embodiment, parsed versions of content items may be transmitted via the "protocol buffers" protocol library developed by GOOGLE™ for transmitting structured binary information over a network. Other embodiments may utilize any of a variety of available binary data serialization formats.

In addition, at (6"), the content parsing system 110 may cache the parsed version of the content item into the parsed content data store 112, such that later request by client computing devices 102 can be serviced based on the previously generated parsed version of the content item. The content parsing system 110 may implement a variety of known techniques to ensure that the cached information remains valid, such as associated the parsed version of the content item with expiration data.

At (7), the client computing device 102 may utilize the parsed version of the content item to generate a display of the content item. In one embodiment, the client computing device 102A includes a browser application (which may be the same type of browsing application implemented by the content parsing server 116) configured to reconstruct a parse tree for the content item based on the binary representation of objects included within the parsed version of the content item, and configured to render the content item for display based on that parse tree. For example, where the content item is a web page, the client computing device 102A may utilize the received binary information within the parsed version of the content item to recreate a DOM tree for the content item (e.g., as previously constructed at the content parsing system 110 and transmitted to the client computing device as serialized binary information) and thereafter combine the DOM tree with style information provided within the content item and configuration information of the client computing device 102A to generate a display of the web page on the client computing device 102A. Because the client computing device is not required to parse the content item to generate binary nodes, the time and computing resources required to generate a display of the content item on the client computing device 102A may be substantially reduced.

With reference to FIG. 2B, an illustrative interaction for utilizing a previously generated parsed version of a content item to service a request of a client computing device 102 will be described. The interactions of FIG. 2B may occur, for example, subsequent to the interactions of FIG. 2A described above, in response to a request by a second computing device 102B for the same content item described in FIG. 2A.

Specifically, the interactions of FIG. 2B begin at (1), where the client computing device 102B transmits a request for a content item to the content parsing system 110. As in FIG. 2A, described above, interaction (1) may represent a hypertext transfer protocol (HTTP) request generated in response to a user of the client computing device 102B entering a URL of a web page into a browser application executing on the client computing device 102A, or selecting a link to a web page from within the browser application. Thereafter, at (2), the content parsing system 110 determines whether a parsed version of the content item has been cached at the content parsing system 110 (e.g., within the parsed content data store 112). For the purposes of FIG. 2B, it will be assumed that a parsed version of the content item has been cached at the content parsing system 110 (e.g., via the interactions of FIG. 2A, above) and that the cached version is considered valid by the content parsing system (e.g., expiration criteria associated with the cached version has not yet been satisfied). Accordingly, at (3), the content parsing system 110 transmits the previously generated parsed version of the content item to the client computing device 102B (e.g., via the "protocol buffer" mechanism or other communication mechanism enabling binary transmission of serialized data). At (4), the client computing device 102B may utilize the parsed version of the content item to display the content item to a user (as described above with reference to FIG. 2A).

One of skill in the art will appreciate that the interactions of FIG. 2B are likely to occur within a substantially shorter period of time than those of FIG. 2A, because the retrieval of a pre-parsed version of a content item from the parsed content data store 112 is likely to occur much more quickly than the retrieval of the content item from the content provider 120A and generation of a parsed version of the content item. Accordingly, where a client computing device 102 requests a content item for which the content parsing system 110 has cached a previously generated parsed version, embodiments of the present disclosure are expected to greatly increase the speed and efficiency at which client computing devices 102 display content items. Moreover, because the content parsing system 110 may have access to greater computing resources than would typically be available to client computing device 102B, the content parsing system 110 may be able to generate and provide a parsed version of a content item more quickly than the client computing device 102B itself would be able to retrieve and parse the content item. Thus, the interactions of FIG. 2A (e.g., in which no previously generated parsed version of a content item is available) may also increase the speed and efficiency at which client computing devices 102 display content items. Moreover, because both the interactions of FIGS. 2A and 2B can remove the requirement that a client computing device 102 parse a content item, the computing resource use of the client computing device 102 can be reduced, which may be especially beneficial to devices with limited computing resources (e.g., mobile devices).

Figure 3:
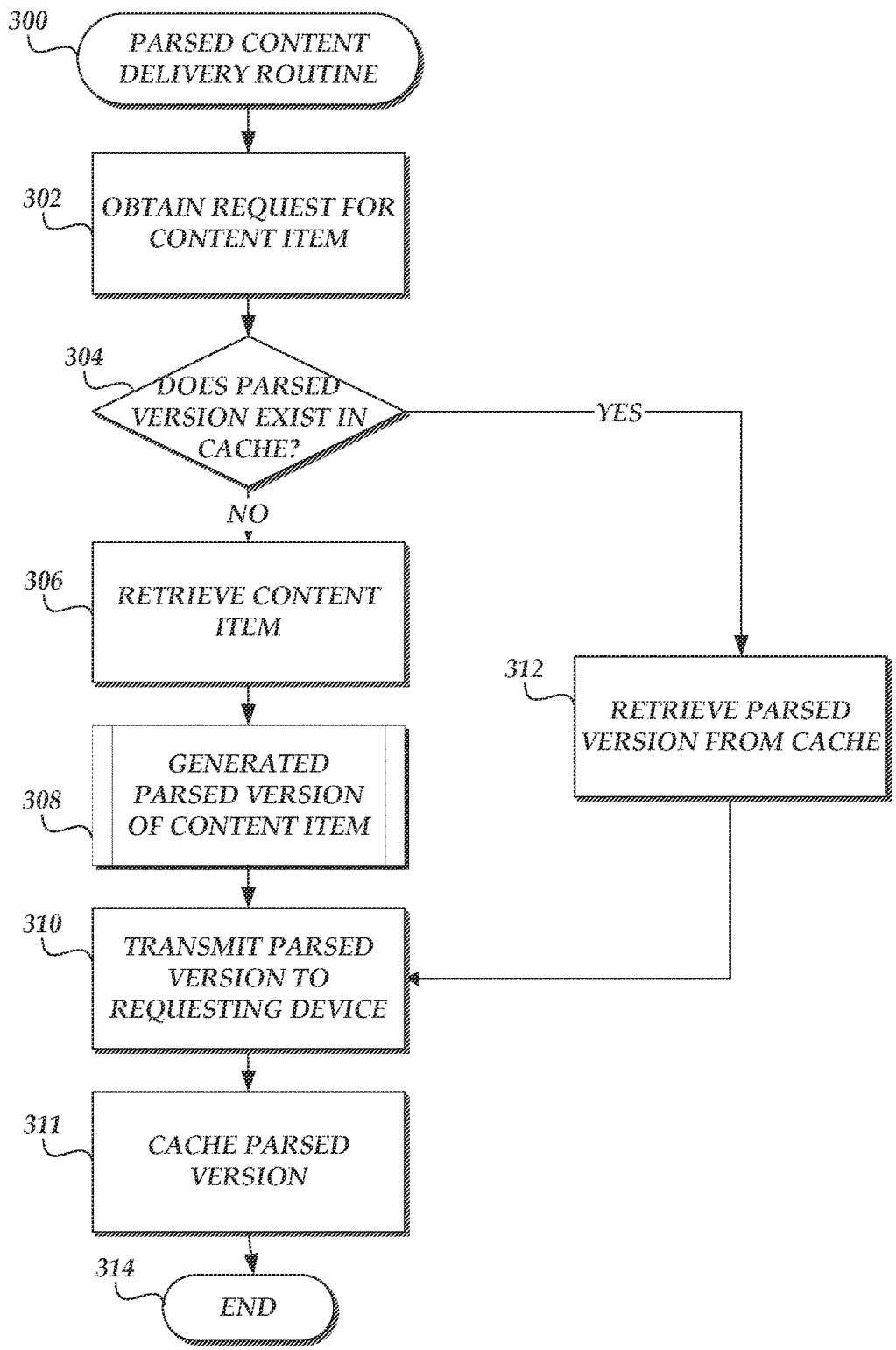
FIG. 3 is a flow chart depicting an illustrative routine that may be implemented by the content parsing system to deliver parsed versions of content items to client computing devices.

With reference to FIG. 3, one illustrative routine 300 for delivering parsed versions of content items to client computing devices 102 will be described. The routine 400 may be carried out, for example, by the content parsing system 110 of FIG. 1.

The routine 300 begins at block 302, where a request for a content item, such as an HTML document representing a web page, is obtained at the content parsing system 110 (e.g., at the interface server 114). Illustratively, the request represent an HTTP request generated and transmitted to the content parsing system 110 by a browser or other software application executing on a client computing device 102A. At block 304, the content parsing system 110 determines whether a parsed version of the requested content item exists in a cache (e.g., the parsed content item data store 112). If so, the routine 300 continues to block 312, wherein the parsed version of the content item is retrieved from the cache. The routine 300 then continues to block 316, where the parsed version is transmitted to the requesting client computing device 102 via a serializable binary data transmission protocol (such as a protocol complying with the "protocol buffers" mechanism of data transmission or other binary serialization mechanism). As such, the client computing device 102 may be rapidly provided with the parsed version of the content item, including binary representations of objects defined in the content item, and thus enabled to quickly and efficiently display the content item to a requesting user.

In the instance that a parsed version of the content item does not exist within a cache of the content parsing system 110 (or in the instance that a parsed version within the cache has expired or is otherwise invalid), the routine 300 continues at block 306, where the content parsing system 110 retrieves the content item (e.g., the HTML document) from a content provider 120. Illustratively, the content parsing system 110 may retrieve the content item by generating and transmitting a content request (such as an HTTP request) to the content provider 120, and awaiting delivery of the content item from the content provider 120.

The routine 300 then continues at block 308, where a parsed version of the content item is generated at the content parsing system 110. In one embodiment, generation of a parsed version of the content item is achieved by use of a browser application on the content parsing system 110. In some instances, the browser application utilized by the content parsing system 110 may represent a modified version of the browser application used by the requesting client computing device 102, to ensure interoperability by the data between the content parsing system 110 and the client computing device 102. Thus, the browser application may include a layout engine or web browser engine configured to parse markup language within the content item to identify a hierarchy of objects, to generate binary representations of those objects, and to generate a parse tree defining relationships between those objects. However, the browser application of the content parsing system 110 may be modified to enable extraction of each objects binary representation and/or the parse tree. Thus, the content parsing system 110 may pass the retrieved content item to the modified browser application and, after parsing by the browser application, obtain binary representations of objects within the content item and/or a binary parse tree of those objects. Thereafter, the content parsing system 110 may generate a parsed version of the content item that includes the binary representation of objects defined in the content item and/or a binary parse tree of those objects. One illustrative routine for generation of parsed versions of content items will be described in more detail with respect to FIG. 5.

At block 310, the parsed version of the content item is transmitted to the requesting computing device 102, enabling the requesting computing device 102 to display the content item without parsing at least a portion of the markup-language included therein. In some embodiments, transmission of a parsed version of a content item to the requesting device may occur after the content item has been completely parsed by the content parsing system 110. As such, blocks 308 and 310 may be implemented separately. In another embodiment (as discussed in more detail with respect to FIG. 5, below), portions of the parsed version of the content item may be transmitted as they are generated at the content parsing system 110, and may be reconstructed at the requesting computing device 102 to generate a parse tree for the content item. In such embodiments, blocks 308 and 310 may occur at least partially simultaneously, such that transmission of a first part of the parsed version of the content item occurs while a second part of the parsed version is being generated at the content parsing system 110.

Thereafter, at block 311, the content parsing system 110 stores the parsed version of the content item within a cache (e.g., the parsed content item data store 112) for later delivery to additional computing devices 102. In some embodiments, block 309 may be implemented by the content parsing system 110 only after verifying that no personal or private information is included within the parsed version of the content item, to ensure the privacy of the requesting computing device. The routine 300 can then end at block 314.

Figure 4:
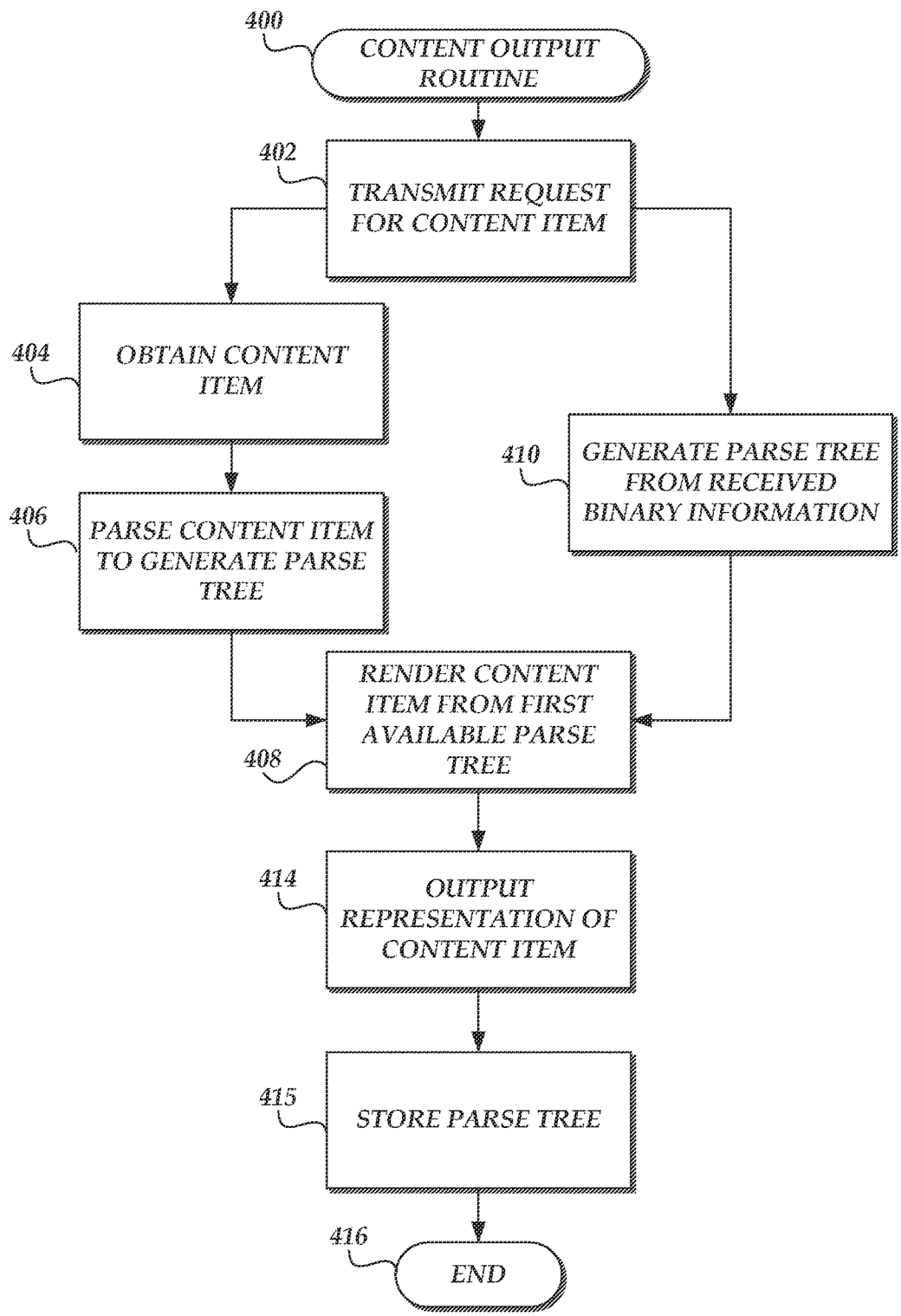
FIG. 4 is a flow chart depicting an illustrative routine that may be implemented by a client computing device to utilize parsed versions of content items to display such content items.

With reference to FIG. 4, one illustrative routine 400 for display of a parsed version of a content item on a client computing device 102 will be described. Specifically, the routine 400 represents an algorithm for selectively displaying a previously parsed version of the content item on a client computing device 102 only in instances where use of a previously parsed version of a content item increases the speed at which the content item is displayed by the client computing device 102. As will be described below, implementation of the routine 400 on a client computing device 102 may cause the client computing device 102 to attempt to both load a content item from unparsed information (e.g., an HTML document) as well as from a parsed version of the content item. Implementation of the routine 400 may further cause the client computing device 102 to output whichever version of the content item is first available for display by the client computing device 102. As such, the routine 400 enables a client computing device 400 to selectively utilize previously parsed versions of content items only in instances where such use increases the speed of the client computing device 102.

The routine 400 begins at block 402, where a request for a content item is transmitted to the content parsing system 110. As noted above, such a request may be obtained based on input received from a user of the client computing device 102 (e.g., selection of a link, input of a URL, etc.), and transmitted to the content parsing system 110 via the network 130 (e.g., via the HTTP protocol).

Thereafter, the routine 400 proceeds concurrently, where the client computing device 102 attempts to receive both an unparsed version of the content item (e.g., an HTML version of the content item) and a parsed version of the content item at blocks 404 and 410, respectively. In one embodiment, concurrent implementation of blocks 404 and 410 may be achieved loading of a specialized content item on the client computing device 102, which references both parsed an unparsed versions of a content item. For example, the content parsing system 110 may return a specialized HTML document to the client computing device 102 that includes inline frames ("iframes") targeted to both parsed and unparsed versions of a content item. Software on the client computing device 102 (e.g., a web browser), may attempt to load both inline frames simultaneously. As used herein, simultaneous processes are intended to refer to processes that are both logically active on a client computing device 102, and that may progress independently on the client computing device 102, regardless of whether the client computing device 102 executes the processes concurrently (e.g., by interleaving the processes on a single processor) or in parallel (e.g., by executing the processes independently on multiple processors).

With reference to the branch of the routine beginning at block 404, the client computing device 404 may retrieve an unparsed version of the content item, such as an HTML document of the content item. Thereafter, the routine 400 continues at block 406, where the client computing device 102 attempts to parse the content item to generate a parse tree for the content item. Illustratively, the client computing device 102 may pass the unparsed version of a content item to a web browser engine or layout engine included with a browser of the client computing device 102, which may attempt to build a parse tree from the objects defined within the content item.

Simultaneously to blocks 404 and 410, the client computing device 102 may attempt, at block 410, to generate a parse tree for the content item based on binary information received from the content parsing system 110 (e.g., information representing a serialization of a parse tree generated at the content parsing system 110). Specifically, the client computing device 102 may receive a set of serialized binary data representing objects defined within the content item and, in some instances, denoting the hierarchical structure of such objects. The client computing device 102 may then construct a parse tree from this received set of serialized binary data. Because the client computing device 102 is enabled to generate the parse tree directly from received binary data, rather than by parsing an HTML document, generation of a parse tree from an obtained parsed version of the content item will generally proceed more quickly than generation of a parse tree from an HTML document itself. However, in some instances (such as those in which the content parsing system 110 has not previously cached the parsed version of the content item), a delay at the client computing device 102 may occur while the content parsing system 110 generates the parsed version of the content item. In other instances (such as those in which the content parsing system 110 has previously cached the parsed version of the content item), implementation of block 410 may occur quickly. As such, it may not be possible to determine, prior to implementation of the routine 400, whether blocks 404 and 406 will be completed more quickly than block 410, or vice versa.

After at least one of block 406 or 410 are completed, the routine 400 continues to block 408, where the client computing device renders the content item based on the first available parse tree for the content item, as generated at either block 406 or block 410. In one embodiment, implementation of block 408 may halt implementation of either block 406 or 410, if uncompleted. Rendering of a content item based on parsed information may include, for example, combining the parse tree with style information (e.g., contained within an HTML document itself or external CSS files) as well as with configuration information of the client computing device 102 (e.g., viewing window size, display resolution, etc.) to generate a representation of the content item for output by the client computing device 102. Thereafter, that representation of the content item can be output to a user of the client computing device 102 at block 414.

In addition, either prior to, simultaneously with, or after outputting the representation of the content item, the client computing device may store the binary representation of the content item for subsequent use, at block 415. Illustratively, the client computing device may utilize the binary representation to service subsequent requests to view the content item, such that blocks 404, 406 and 410 may be omitted from the routine 400. In some embodiments, requests for the content item may be received directly from a user (e.g., in response to a user entering a URL of the content item into an application on the client computing device, or selecting the content item from a history of viewed content items on the client computing device). In other embodiments, the request for a content item may be generated automatically, based on a reference to the content item within an additional content item. For example, where the content item is an HTML document referenced within an "iframe" of a web page, the client computing device may utilize a previously generated parse tree for the HTML document to generate the iframe object.

After display of the representation of the content item, the routine 400 may end at block 416.

While the routine 400 is illustratively described with reference to a displayable content item represented by a parse tree, other embodiments of the routine 400 may process alternative textual, non-binary content items to produce a binary representation of that textual, non-binary content item. For example, the routine 400 may be utilized to generate a binary representation of a JAVASCRIPT file, by either parsing the JAVASCRIPT file locally at the client computing device (e.g., in blocks 404 and 406), or by receiving serialized binary information representative of the JAVASCRIPT file (e.g., at block 410) which is reconstructed by the client computing device 410 into a binary representation of the JAVASCRIPT file. As such, the routine 400 may be utilized to receive serialized binary information representing any textual, non-binary content item, enabling a client computing device to utilize the textual, non-binary content item without actually parsing the textual information contained therein. The routine 400 may further be utilized to store binary representations of such textual, non-binary content items for later use by a client computing device. For example, a client computing device 400 may stored a binary representation of a JAVASCRIPT file within a cache, such that subsequent requests for the JAVASCRIPT file (e.g., within one or more HTML documents) may be serviced based on the previously generated binary representation, without re-parsing the JAVASCRIPT file.

Various embodiments of the routine 400 may omit one or more interactions described above, or include additional or alternative embodiments. For example, one embodiment of the routine 400 may omit block 415, to reduce the memory requirements associated with storing binary representations of textual, non-binary content items. Other embodiments may omit blocks 404 and 406, such that textual, non-binary content items are always parsed at least once at the client computing device, but that subsequent requests for the content item may be serviced based on stored binary representations of the content item. Other variations of the routine 400 are possible within the scope of the present disclosure.

Figure 5:
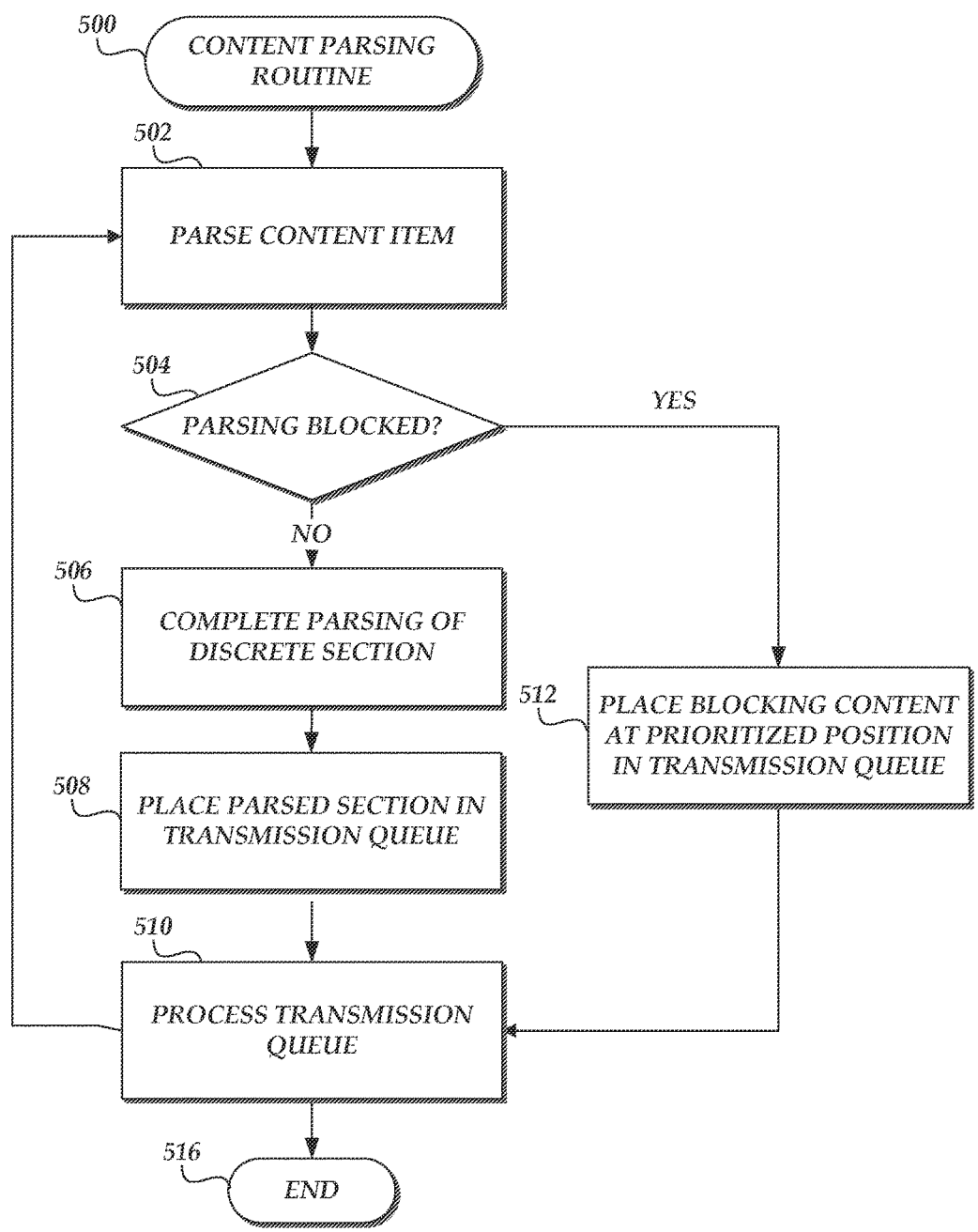
FIG. 5 is a flow chart depicting an illustrative routine that may be implemented by the content parsing system to generate a parsed version of a content item and to transmit the parsed version of the content item to a client computing device in a prioritized order that enables the client computing device to more quickly render the content item.

With reference to FIG. 5, one illustrative routine 500 for generating a parsed version of a content item and delivering the parsed version to a client computing device 102 will be described. Specifically, the routine 500 can enable the content parsing system 110 to utilize information gained while parsing a content item to prioritize the order in which portions of the content item are delivered to the client computing device 102, or to enable the client computing device 102 to "pre-fetch" external, additional content items that would slow display of the content item.

The routine 500 begins at block 502, where the content parsing system 110 (e.g., via the content parsing server 116) initiates parsing of the content item. Illustratively, where the content item is a web page represented by an HTML document, the content parsing server 116 may load the HTML into a browser application including a web browser engine or layout engine configured to parse HTML and identify a hierarchical structure of objects defined within the HTML.

The routine 500 then continues at block 504, where the content parsing server 116 determines whether parsing of the content item has been blocked. "Blocking" of the parsing of a content item can generally refer to instances in which a computing devices has not yet received information needed to parse a content item, and therefore must await reception or generation of the information. In one embodiment, blocking may occur by the inclusion of JAVASCRIPT or other client-side scripting information included within the content item. In another embodiment, blocking may occur by inclusion within the content item of references to external information, such as external CSS documents or JAVASCRIPT code. Because blocking delays the completion of a parse tree for a content item (and thus, the actual output of the content item on a client computing device), blocking is generally undesirable. Moreover, blocking is often the product of inefficiencies within a content item that could be eliminated or reduced by reorganizing the format of the content item. For example, blocking caused by client-side scripting or CSS documents incorporated or referenced near the end of an HTML file may be reduced or eliminated by incorporating the client-side scripting or CSS documents near the top of the HTML file.

Moreover, where blocking is caused by additional, external content items (e.g., client-side scripting or CSS documents) referenced within a primary content item, blocking may be reduced by pre-fetching the external content items at a client computing device 102. In instances where a content item is parsed at a client computing device 102, the client computing device 102 may not be aware of the need for such external content items prior to rendering the primary content item, and thus pre-fetching may not be possible (or may provide only a slight increase in the speed at which the content item is displayed). However, because embodiments of the present application enable rendering of a content item at a content parsing system 110 distinct from the client computing device 102, the content parsing system 110 may utilize knowledge gained while parsing content items to enable a client computing device 102 to pre-fetch external content items (e.g., while the content parsing system 110 is itself retrieving the external content items, or while the content parsing system 110 is still parsing the content item), and thus reduce blocking that may occur when the client computing device 102 recreates a parse tree from the information generated at the content parsing system 110.

In instances where blocking is detected during parsing of a content item, the routine 500 continues to block 512, where the blocking content (e.g., client side scripting or style data) is placed within a prioritized position in a transmission queue storing information to be transmitted to the client computing device 102. In one embodiment, blocking content may be placed at the head of the transmission queue, such that it is the next item of content transmitted to a client computing device 102. In other embodiments, blocking content may be prioritized above non-blocking content to be transmitted to the client computing device (described below), but not above other prior items of blocking content placed within the transmission queue Thereafter, at block 510, the content parsing system 110 begins to process the transmission queue by transmitting data to the client computing device 102. Specifically, the content parsing system 110 may generate a serialized binary representation of data within the transmission queue (e.g., blocking data, objects defined by a content item, portions of a parse tree, etc.) and transmit the serialized binary representation to the client computing device 102. Such transmission may occur, for example, according to the "protocol buffer" mechanism for data serialization, discussed above, or by any number of known binary data serialization protocols.

While processing of the transmission queue 510 is described herein in sequence with other blocks of the routine 500, embodiments of the present disclosure may process the transmission queue asynchronously to the other interactions of the routine 500. As such, the content parsing system 110 may continually transmit information placed within the transmission queue to a client computing device 102, while further execution of the routine 500 continues. In some instances, the transmission queue may utilize parallel channels of communication to the client computing device 102, such that multiple sets of data can be transmitted to the client computing device 102 simultaneously.

Further, while examples are provided herein in which blocking content itself is transmitted to the client computing device 102, some embodiments may enable the content parsing system 110 to notify the client computing device 102 of potentially blocking content, such that the client computing device 102 may itself retrieve (e.g., "pre-fetch") the potentially blocking content. For example, the content parsing system 110, one detecting blocking content, may transmit to the client computing device 102 a reference to the blocking content, such that receipt of the reference at a client computing device 102 causes the computing device 102 to retrieve the blocking content from a third party (e.g., a content provider 120). For example, a URL or other link to blocking content may be placed within the transmission queue and transferred to the client computing device 102 to cause the client computing device 102 to immediately being retrieving the blocking content. Thus, delays at the client computing device 102 in building a parse tree for the content item may be reduced or eliminated.

The routine 500 then continues at block 502, where the content parsing system 110 continues to parse the content item. In the instance that no new blocking content is identified, the routine continues to block 506, where parsing of at least one discrete section of the content item is completed. Discrete sections of the content item may generally include any portion of the content item that may be independently processed by a receiving client computing device 102. In one embodiment, discrete sections include individual "nodes" of a parse tree (e.g., individual objects defined by a content item). In another embodiment, discrete sections include one or more sub-trees included within a parse tree of the content item. For example, where a content item is an HTML document, discrete sections may include a "head" subtree and a "body" subtree (both of which represent commonly included portions of HTML documents). The granularity of discrete sections may be selected by the content parsing system 110 according to the specific configuration of the client computing device 102, such that the client computing device 102 can continue reconstruction rendering the content item on receipt of each discrete section.

Thereafter, the routine 500 continues at block 508, where the completed discrete section is placed in the transmission queue for delivery to the client computing device 508. The routine 500 may continue until the transmission queue is empty, and no additional sections of the content item are available for parsing. Thereafter, the routine 500 may end at block 516.

One skilled in the art will appreciate that the routine 500 may include fewer or more interactions than described above. For example, in some embodiments, the routine 500 may include interactions enabling the content parsing system 110 to gracefully fail in generating a parsed version of the content item (e.g., to enable the client computing device 102 to output the content item based on an unparsed version of the content item). Failure in generating a parsed version of a content item may occur, for example, due to specific markup language or computer-executable instructions included within the content item. For example, parsing of a content item may fail where the content item includes client-side scripting that modifies a previously parsed section of the content item that has already been transmitted to the client computing system. As a further example, parsing of a content item may fail where the content item includes client-side scripting that would have a result on the client computing device 102 that cannot be determined by the content parsing system 110 (e.g., client-side scripting whose result is based on information included in the client computing device 102 or whose result is based on temporal information that may change prior to delivery of the parsed version of the content item to the client computing device). In such instances, the routine 500 may include additional interactions (not shown in FIG. 5) enabling the client computing device 102 to render an unparsed version of the content item. For example, on failure of the content parsing system 110 to generate a parsed version of the content item, the content parsing system 110 may transmit an unparsed version of the content item (e.g., an HTML document) to the client computing device 110 for output (e.g., in accordance with typical operation of browser applications). Illustratively, a client computing device 102 may distinguish between parsed and unparsed versions of a content item based on information placed within the content item by the content parsing system 110. For example, the content parsing system 110 may designate parsed versions of a content item with a specialized internet media type (sometimes referred to as a multipurpose internet mail extension or "MIME" type), such that the client computing device 110 utilizes serialized binary data received from the content parsing system 110 to render a content item, rather than attempting to parse information of the content item directly. Various further modifications or additions to the routine 500 may be made without departing from the scope of the present disclosure. Accordingly, the interactions of routine 500 are intended to be illustrative in nature, rather than exhaustive.

Figure 6:
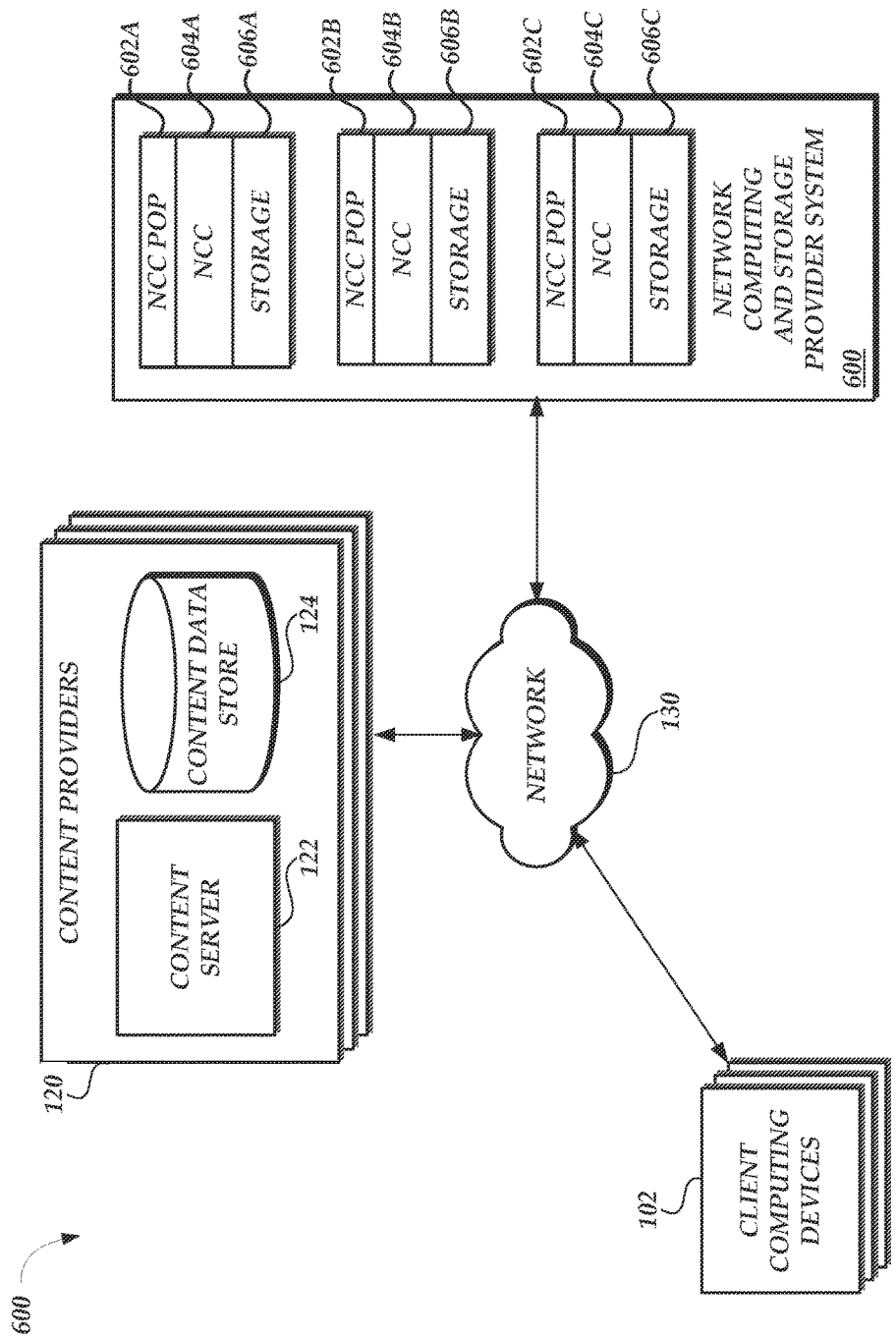
FIG. 6 is a block diagram depicting an illustrative operating environment for providing an instance of the content parsing system 116 of FIG. 1 via a network computing and storage provider system, which may also be referred to as a hosted computing or cloud computing environment.

As noted above, some embodiments of the present disclosure may utilize web services to generate the content parsing system 110 of FIG. 1. One example of an operating environment 600 utilizing such web services is shown in FIG. 6. Specifically, the operating environment 600 of FIG. 6 includes the client computing devices 102, content providers 120, and network 130 described above with reference to FIG. 1, as well as a network computing and storage provider 600 configured to implement the content parsing system 110 of FIG. 1 (not shown in FIG. 6).

The network computing and storage provider system 600 illustrated in FIG. 6 corresponds to a logical association of one or more computing devices associated with a network computing and storage provider. Specifically, the network computing and storage provider system 600 can include a number of Point of Presence ("POP") locations 602 that correspond to nodes on the communication network 130. Each POP 602 includes a network computing component (NCC) 604 for hosting applications, services or virtual systems, such as an instance of the content parsing server 116. One skilled in the relevant art will appreciate that NCC 604 would include physical computing device resources and software to provide multiple instances of virtual machines implementing a content parsing server 116, or to dynamically cause the creation of instances of a virtual machine implementing the content parsing server 116. Such creation can be based on a specific request, such as from a client computing device 102, or the NCC can initiate dynamic creation of an instance of a virtual machine on its own. Each NCC POP 602 also includes a storage component 606 made up of a number of storage devices for storing any type of data used in the delivery and processing of network or computing resources, including but not limited to user data, state information, processing requirements, historical usage data, cached parsed content and resources from content providers 120 that will be processed by an instance of an NCC 604 and transmitted to various client computing device 102. The NCCs 604 and the storage components 606 may further include additional software and/or hardware components that facilitate communications including, but not limited to, load balancing or load sharing software/hardware components for selecting instances of a virtual machine supporting a requested application and/or providing information to a domain name system ("DNS") name server to facilitate request routing. In some instances, NCCs 604 may be referred to as a hosted computing environment or a cloud computing environment.

In an illustrative embodiment, NCCs 604 and the storage components 606 are considered to be logically grouped, regardless of whether the components, or portions of the components, are physically separate. For example, a network computing and storage provider system 700 may maintain separate POPs 602 for providing each of the NCCs 604 and the storage components 606. Additionally, although the NCC POPs 602 are illustrated in FIG. 6 as logically associated with a network computing and storage provider system 600, the NCC POPs will be geographically distributed throughout the communication network 130 in a manner to best serve various demographics of client computing devices 102. Additionally, one skilled in the relevant art will appreciate that the network computing and storage provider system 600 can be associated with various additional computing resources, such additional computing devices for administration of content and resources, and the like. Even further, one skilled in the relevant art will appreciate that the components of the network computing and storage provider system 600 and components of the content providers 120 can be managed by the same or different entities.

Figure 7:
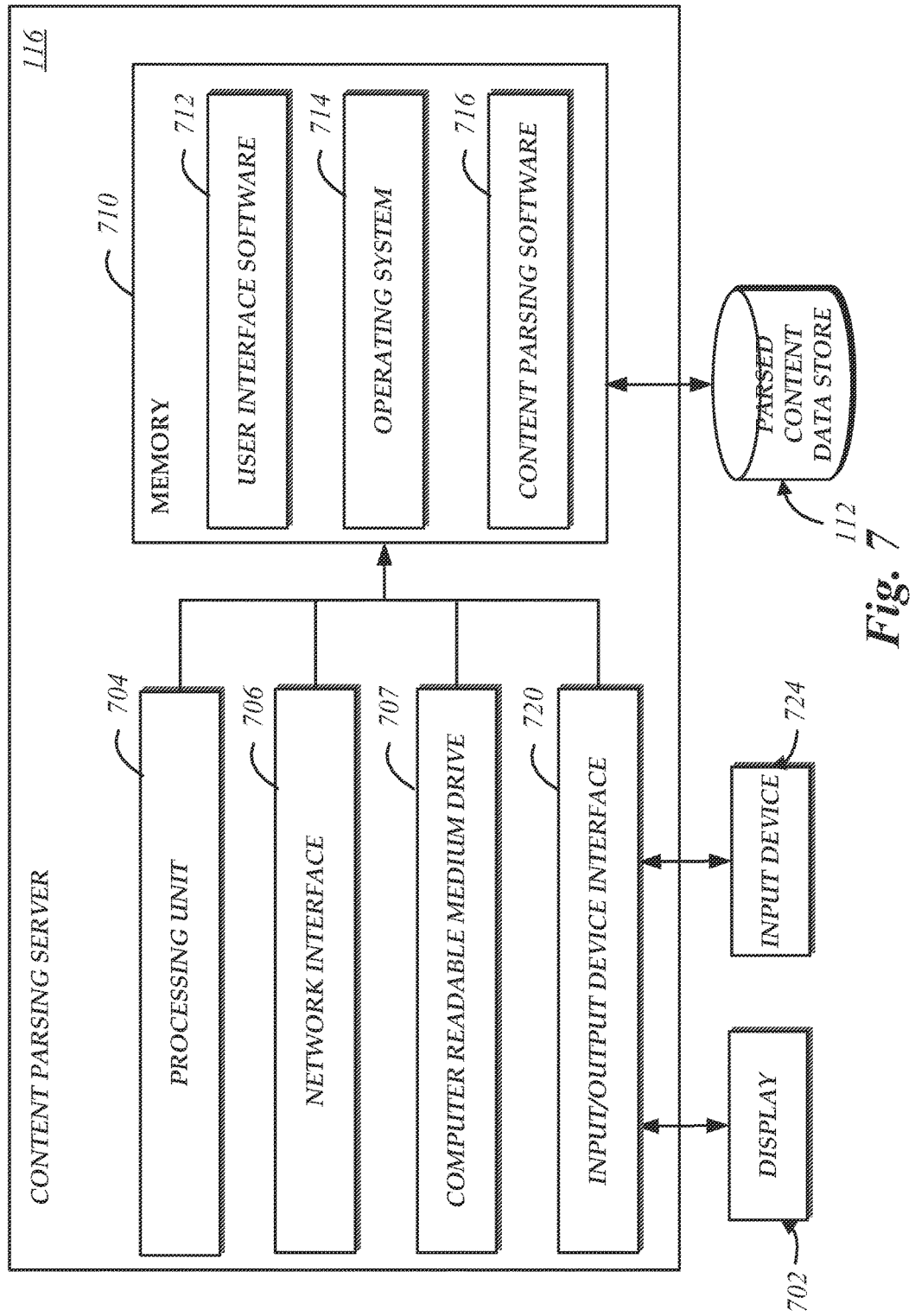
FIG. 7 is a block diagram depicting an illustrative configuration of one embodiment of the content parsing system 116 of FIG. 1.

FIG. 7 depicts one embodiment of an architecture of the content parsing server 116, which may be a dedicated physical server or may be implemented as a virtual server (e.g., within the NCCs 604 of FIG. 6). The general architecture of the content parsing server 116 depicted in FIG. 7 includes an arrangement of computer hardware and software components that may be used to implement aspects of the present disclosure. As illustrated, the content parsing server 116 includes a processing unit 704, a network interface 706, a computer readable medium drive 707, an input/output device interface 720, a display 702, and an input device 724, all of which may communicate with one another by way of a communication bus. The network interface 706 may provide connectivity to one or more networks or computing systems, such as the network 130 of FIG. 1. The processing unit 704 may thus receive information and instructions from other computing systems or services via a network. The processing unit 704 may also communicate to and from memory 710 and further provide output information for a display 702 via the input/output device interface 720. The input/output device interface 720 may also accept input from the optional input device 724, such as a keyboard, mouse, digital pen, etc. In some embodiments, the content parsing server 116 may include more (or fewer) components than those shown in FIG. 7. For example, some embodiments of the content parsing server 116 may omit the display 702 and input device 724, while providing input/output capabilities through one or more alternative communication channel (e.g., via the network interface 706).

The memory 710 may include computer program instructions that the processing unit 704 executes in order to implement one or more embodiments. The memory 710 generally includes RAM, ROM and/or other persistent or non-transitory memory. The memory 710 may store an operating system 714 that provides computer program instructions for use by the processing unit 704 in the general administration and operation of the server 700. The memory 710 may further include computer program instructions and other information for implementing aspects of the present disclosure. For example, in one embodiment, the memory 710 includes user interface software 712 that generates user interfaces (and/or instructions therefor) for display upon a computing device, e.g., via a navigation interface such as a web browser installed on the computing device. In addition, memory 710 may include or communicate with one or more auxiliary data stores, such as data store 112.

In addition to the user interface module 712, the memory 710 may include content parsing software 716 that may be executed by the processing unit 704. In one embodiment, the content parsing software 716 implements various aspects of the present disclosure, e.g., reception of textual, non-binary content items and parsing such textual, non-binary content items into corresponding binary representations. While the content parsing software 716 is shown in FIG. 7 as part of the server 700, in other embodiments, all or a portion of the software may be implemented by alternative computing devices within the content parsing system 110, such as virtual computing devices within a hosted computing environment.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
 a data store including computer-executable instructions for providing a parsed version of a first content item in response to a request for the first content item; and
 a processor in communication with the data store and configured to implement the computer-executable instructions, wherein the computer-executable instructions, when implemented by the processor, cause the processor to:
  receive, from a client computing device in communication with the system via a network, the request for the first content item, the first content item including hypertext markup language (HTML) defining a plurality of objects arranged according to a document object model (DOM) tree;
  retrieve the first content item;
  parse the HTML to generate a binary representation of the DOM tree;
  during parsing of the HTML at the system to generate the binary representation of the DOM tree and prior to completion of the parsing at the system:

identify a second content item referenced in the HTML that is required to complete the binary representation of the DOM tree; and transmit, to the client computing device and via the network, instructions for the client computing device to begin retrieval of the second content item from a location on the network; and subsequent to completion of the parsing, by the processor, to generate the binary representation of the DOM tree at the system, transmit the binary representation of the DOM tree from the system to the client computing device via the network, wherein the client computing device is configured to utilize the binary representation of the DOM tree, transmitted to the client computing device from the system, and the second content item, retrieved by the client computing device in response to the instructions transmitted to the client computing device during parsing of the HTML and prior to completion of the parsing by the processor, to display the first content item at the client computing device.

2. The system of claim 1, wherein the markup language is formatted according to at least one of hypertext markup language (HTML), extensible HTML (XHTML), or extensible markup language (XML).

3. The system of claim 1, wherein the computer-executable instructions further cause the processor to serialized the binary representation of the DOM tree prior to transmission.

4. The system of claim 1, wherein the second content item is at least one of a client-side script or a cascading style sheet (CSS).

5. The system of claim 1, wherein the computer-executable instructions further cause the processor to:

identify that a third content item referenced in the markup language is not required to complete parsing of the of the markup language; and transmit, to the client computing device and via the network, instructions to delay retrieval of the third content item.

6. A computer-implemented method implemented by a computing system, the computer-implemented method comprising:

receiving, from a client computing device in communication with the computing system via a network, a request for a textual, non-binary content item, the content item defining a plurality of objects;

retrieving information representing the plurality of objects defined by the first content item;

parsing text of the textual, non-binary content item to generate a binary representation of the plurality of objects;

prior to completion of the parsing at the computing system to generate the binary representation:

identifying content referenced within the textual, non-binary content item that must be processed prior to completing the parsing of the textual, non-binary content item; and transmitting, to the client computing device and via the network, instructions for the client computing device to begin retrieval of the identified content from a location on the network; and subsequent to generation of the binary representation at the computing system, transmitting the binary representation of the plurality of objects from the computing system to the client computing device via the network, wherein the client computing device is configured to utilize the binary representation of the plurality of objects transmitted to the client computing device from the system, and the identified content, retrieved by the client computing device in response to the instructions transmitted to the client computing device prior to completion of the parsing, to display the content item.

7. The computer-implemented method of claim 6, wherein the plurality of objects is arranged within an object hierarchy.

8. The computer-implemented method of claim 7, wherein the object hierarchy is a Document Object Model (DOM) tree.

9. The computer-implemented method of claim 7, wherein the binary representation of the plurality of objects comprises a binary representation of the object hierarchy.

10. The computer-implemented method claim 6, wherein the identified content is at least one of computer-executable code included within the content item or a second content item referenced within the content item.

11. The computer-implemented method claim 10, wherein the computer-executable code includes client-side scripting.

12. The computer-implemented method of claim 6, wherein the location on the network is a location associated with the computing system.

13. The computer-implemented method of claim 6, wherein transmitting instructions to begin retrieval of the identified content comprising transmitting an identifier of the identified content.

14. The computer-implemented method of claim 6 further comprising serializing the binary representation of the plurality of objects prior to transmission.

15. The computer-implemented method of claim 6, wherein parsing the text of the textual, non-binary content item comprising parsing markup language included within the textual, non-binary content item.

16. The computer-implemented method of claim 6, further comprising:

identifying that a portion of the text of the textual, non-binary content item is not required to initially display the content item; and delaying transmission of the portion of the text of the textual, non-binary content item.

17. A computer-implemented method implemented by a first computing system, the computer-implemented method comprising:

transmitting, to a content parsing system distinct from the first computing system, a request for a first content item, wherein the first content item includes a textual, non-binary representation of a plurality of objects;

receiving, from the content parsing system, instructions to begin retrieval from a network location of a second content needed to display the first content, wherein the second content is identified by the content parsing system during parsing of the first content and prior to completion of the parsing of the first content item at the content parsing system;

obtaining the second content responsive to the instructions;

subsequently to obtaining the second content, receiving a binary representation of the first content from the content parsing system;

constructing a parse tree for the second content based at least in part on: (i) the second content that was obtained in response to the instructions received from the content parsing system to being retrieval of the second content and (ii) the binary representation of the first content received from the content parsing system; and rendering the first content for display on the first computing system based at least in part on the parse tree.

18. The computer-implemented method of claim 17, wherein the second content is at least one of a client-side script or a cascading style sheet (CSS).

19. The computer-implemented method of claim 17, wherein the location corresponds to at least one of a location identified within the first content item or an alternative location identified within the indication.

20. The computer-implemented method of claim 17, wherein the instructions to begin retrieval of the second content needed to display the first content includes an identifier of the second content.

21. The computer-implemented method of claim 17, wherein the network location is a universal resource locator (URL) from which the second content can be obtained.

* * * * *

UNITED STATES PATENT AND TRADEMARK OFFICE
CERTIFICATE OF CORRECTION

PATENT NO. : 10,296,580 B1
APPLICATION NO. : 14/859092
DATED : May 21, 2019
INVENTOR(S) : Venkata Sri Krishnakanth Pulla Page 1 of 1

It is certified that error appears in the above-identified patent and that said Letters Patent is hereby corrected as shown below:

In the Specification

At Column 16, Line 10, after "queue" insert --.--.

In the Claims

At Column 21, Lines 35-36, Claim 5 change "of the of the" to --of the--.

At Column 22, Line 16, Claim 10 after "method" insert --of--.

At Column 22, Line 20, Claim 11 after "method" insert --of--.

Signed and Sealed this
Third Day of September, 2019

Andrei Iancu
*Director of the United States Patent and Trademark Office*